(12) United States Patent
Cheng et al.

(10) Patent No.: US 9,811,607 B2
(45) Date of Patent: Nov. 7, 2017

(54) SYSTEM AND METHOD TO EXTRACT UNIQUE ELEMENTS FROM SORTED LIST

(71) Applicant: Texas Instruments Incorporated, Dallas, TX (US)

(72) Inventors: Victor Cheng, Tamarac, FL (US); Pramod Swami, Bangalore (IN); Prashanth Viswanath, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 339 days.

(21) Appl. No.: 14/632,822

(22) Filed: Feb. 26, 2015

(65) Prior Publication Data

US 2016/0253365 A1  Sep. 1, 2016

(51) Int. Cl.
*G06F 17/30* (2006.01)
(52) U.S. Cl.
CPC .............. *G06F 17/30988* (2013.01)
(58) Field of Classification Search
CPC .... G06F 17/30; G06F 17/00; G06F 17/30988; G06F 17/30129
USPC ................................................. 707/600–899
See application file for complete search history.

(56) References Cited

U.S. PATENT DOCUMENTS 6,327,508 B1 * 12/2001 Mergard .............. G05B 19/045
700/1

* cited by examiner

*Primary Examiner* — Isaac M Woo
(74) *Attorney, Agent, or Firm* — Lawrence J. Bassuk; Charles A. Brill; Frank D. Cimino

(57) ABSTRACT

A device includes an input array register, a determining component and a computing component. The input array register stores a sorted list of n elements as an input array having size n, n being an integer greater than or equal to two. The determining component creates a list of m elements as a mask array having a size m, m being an integer greater than or equal to one, one of the m elements being based on two adjacent of the n elements of the input array. The computing component performs a mathematical operation between the input array and the mask array to generate a list of p elements as an output array having a size p, p being an integer greater than or equal to 0, the p elements identifying unique elements within the n elements.

20 Claims, 5 Drawing Sheets

SYSTEM AND METHOD TO EXTRACT
UNIQUE ELEMENTS FROM SORTED LIST

BACKGROUND

Embodiments of the disclosure relate to a device and method to extract unique elements from a sorted list.

The ability to extract unique elements from a sorted list is relevant in many industries. For example, in the image processing industry it is beneficial to determine similarities between images, calculate optical flow, and to determine if an object is present in different frames of an image. To accomplish these goals, numerical values are assigned to sections of an image, the sections being single pixels or groups of pixels. To determine similarities between images or whether an object is present in different frames, the sorted, numerical values of each image are compared to each other. The unique numerical values are of significance because they indicate if a unique feature is present in both images. To calculate optical flow, the position of the unique feature is determined in each image, and the velocity of the feature can be determined.

Traditional methods for extracting unique elements from a sorted list use scalar processors, which process only one data point at a time. Scalar processors are inefficient, and thus there exists a need for a more efficient device and method to extract unique elements from a sorted list.

What is needed is a system and method for extracting unique elements from a sorted list that is more efficient that traditional systems and methods.

BRIEF SUMMARY

The present disclosure provides a system and method for extracting unique elements from a sorted list that is more efficient that traditional systems and methods.

Aspects of the present disclosure are drawn to a device including an input array register, a determining component and a computing component. The input array register stores a sorted list of n elements as an input array having size n, n being an integer greater than or equal to two. The determining component creates a list of m elements as a mask array having a size m, m being an integer greater than or equal to one, one of the m elements being based on two adjacent of the n elements of the input array. The computing component performs a mathematical operation between the input array and the mask array to generate a list of p elements as an output array having a size p, p being an integer greater than or equal to 0, the p elements identifying unique elements within the n elements.

Additional advantages and novel features of the disclosure are set forth in part in the description which follows, and in part will become apparent to those skilled in the art upon examination of the following or may be learned by practice of the disclosure. The advantages of the disclosure may be realized and attained by means of the instrumentalities and combinations particularly pointed out in the appended claims.

BRIEF SUMMARY OF THE DRAWINGS

The accompanying drawings, which are incorporated in and form a part of the specification, illustrate example embodiments and, together with the description, serve to explain the principles of the disclosure. In the drawings.

DETAILED DESCRIPTION

In contrast to scalar processors, a vector SIMD (single instruction multiple data) processor is a group of processing elements that perform the same operation on multiple data points simultaneously, via vector math, e.g., vector comparing, vector adding and vector subtracting. The instant disclosure uses a vector SIMD architecture to determine unique elements from a sorted list, making the process much more efficient. Aspects of the present disclosure will be described in greater detail with reference to FIGS. 1-22.

Figure 1:
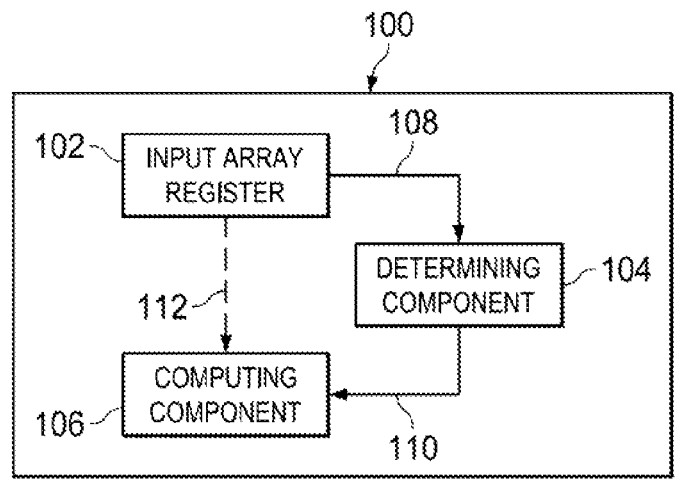
FIG. 1 illustrates an example device in accordance with aspects of the present disclosure.

FIG. 1 illustrates an example device 100 in accordance with aspects of the present disclosure.

As shown in the figure, device 100 includes an input array register 102, a determining component 104, a computing component 106, and pathways 108, 110, and 112.

Device 100 may be part of a larger computer system, or it may be a standalone piece of hardware that can be connected to a computer or processor, via either wired or wireless connection.

Input array register 102 is operable to store a sorted list of n elements as an input array. The sorted list may be stored in input array register 102 via typical input and storage methods, non-limiting examples of which include manual entry, direct entry from an external device (wired or wireless) where the external device communicates directly with input array register 102, or by indirect entry from an external device (wired or wireless) where the external device communicates indirectly with input array register 102.

Determining component 104 communicates with input array register via pathway 108. Pathway 108 could be either a wired or wireless connection. Determining component 104 is operable to receive a sorted input array of n elements from input array register 102 and create a mask array of m elements based on the input array of n elements. In an example embodiment, determining component 104 has a vector SIMD architecture.

Computing component 106 communicates with determining component 104 via pathway 110, and may also communicate directly with input array register 102 via pathway 112. Pathways 110 and 112 could be either wired or wireless connections. Computing component 106 is operable to receive the input array and mask array from determining component 104 and generate an output array that includes the unique elements from the input array. In an example embodiment, computing component 106 has a vector SIMD architecture.

In this embodiment, input array register 102, determining component 104, and computing component 106 are implemented as distinct elements. However, in some embodiments, at least two of input array register 102, determining component 104, and computing component 106 may be implemented as a unitary element. Further, in some embodiments, at least one of input array register 102, determining component 104, and computing component 106 may be implemented as non-transient, tangible computer-readable media for carrying or having computer-executable instructions or data structures stored thereon. Such non-transient, tangible computer-readable media can be any available media that can be accessed by a general purpose or special purpose computer. Non-limiting examples of non-transient, tangible computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (hardwired and/or wireless, or a combination of hardwired or wireless) to a computer, the computer properly views the connection as a non-transient, tangible computer-readable media computer-medium. Thus, any such connection is properly termed a non-transient, tangible computer-readable medium. Combinations of the above should also be included within the scope of non-transient, tangible computer-readable media.

Figure 2:
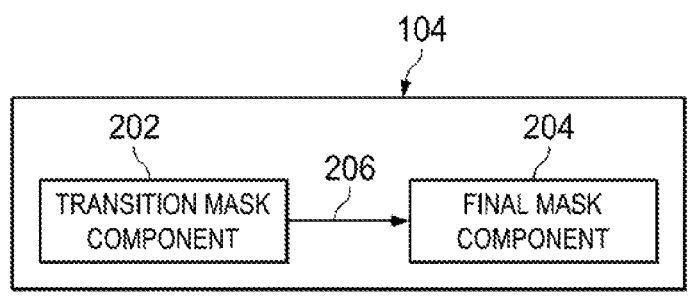
FIG. 2 illustrates an example determining component of the device of FIG. 1 in accordance with aspects of the present disclosure.

FIG. 2 illustrates determining component 104 in accordance with aspects of the present disclosure.

As shown in the figure, determining component 104 includes transition mask component 202, final mask component 204 and pathway 206. In this embodiment, transition mask component 202 and final mask component 204 are implemented as distinct elements. However, in some embodiments, transition mask component 202 and final mask component 204 may be implemented as a unitary element, wherein pathway 206 will not be used. Further, in some embodiments, at least one of transition mask component 202 and final mask component 204 may be implemented as non-transient, tangible computer-readable media for carrying or having computer-executable instructions or data structures stored thereon.

Transition mask component 202 is operable to receive a sorted input array of n elements from input array register 102 and create a transition mask array of n elements based on the input array of n elements. The elements in the transition mask array will have binary values of "0" or "1," based on the elements in the input array.

Final mask component 204 communicates with transition mask component 202 via pathway 206. Final mask component 204 is operable to receive the transition mask array of n elements from transition mask component 202 via pathway 206, and create a final mask array of m elements based on the transition mask array of n elements. The elements in the final mask array will additionally have binary values of "0" or "1," based on the elements in the transition mask array.

In this embodiment, transition mask component 202 and final mask component 204 are implemented as distinct elements. However, in some embodiments, transition mask component 202 and final mask component 204 may be implemented as a unitary element. Further, in some embodiments, at least one of transition mask component 202 and final mask component 204 may be implemented as non-transient, tangible computer-readable media for carrying or having computer-executable instructions or data structures stored thereon.

Figures 3, 4:
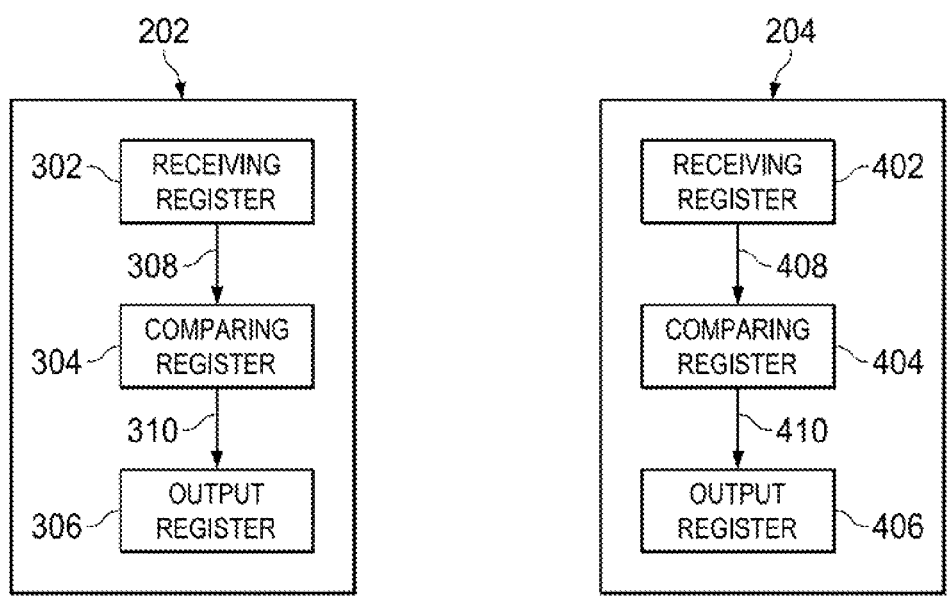
FIG. 3 illustrates an example transition mask component of the determining component of FIG. 2 in accordance with aspects of the present disclosure.
FIG. 4 illustrates an example final mask component of the determining component of FIG. 2 in accordance with aspects of the present disclosure.

FIG. 3 illustrates transition mask component 202 in accordance with aspects of the present disclosure.

As shown in the figure, transition mask component 202 includes a receiving register 302, a comparing register 304, an output register 306, and pathways 308 and 310.

In this embodiment, receiving register 302, comparing register 304 and output register 306 are implemented as distinct elements. However, in some embodiments, at least two of receiving register 302, comparing register 304 and output register 306 may be implemented as a unitary element. Further, in some embodiments, at least one of receiving register 302, comparing register 304 and output register 306 may be implemented as non-transient, tangible computer-readable media for carrying or having computer-executable instructions or data structures stored thereon. In an example embodiment, comparing register 304 has a vector SIMD architecture.

In operation, receiving register 302 is configured to receive an input array from input array register 102 via pathway 108. Receiving register 302 then provides the input array to comparing register 304 via pathway 308. Comparing register 304 proceeds to compare elements of the input array to each other and create a transition mask array based on the outcome of the comparison. Comparing register 304 then provides the transition mask array to output register 306 via pathway 310.

FIG. 4 illustrates final mask component 204 in accordance with aspects of the present disclosure.

As shown in the figure, final mask component 204 includes a receiving register 402, a comparing register 404, an output register 406, and pathways 408 and 410.

In this embodiment, receiving register 402, comparing register 404 and output register 406 are implemented as distinct elements. However, in some embodiments, at least two of receiving register 402, comparing register 404 and output register 406 may be implemented as a unitary element. Further, in some embodiments, at least one of receiving register 402, comparing register 404 and output register 406 may be implemented as non-transient, tangible computer-readable media for carrying or having computer-executable instructions or data structures stored thereon. In an example embodiment, comparing register 404 has a vector SIMD architecture.

In operation, receiving register 402 is configured to receive a transition mask array from output register 306 of transition mask component 202. Receiving register 402 then provides the transition mask array to comparing register 404 via pathway 408. Comparing register 404 proceeds to compare elements of the transition mask array to each other and create a final mask array based on the outcome of the comparison. Comparing register 304 then provides the final mask array to computing component 106.

Figure 5:
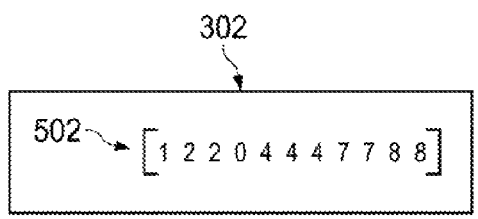
FIG. 5 illustrates an example receiving register used in a first method in accordance with aspects of the present disclosure.

FIG. 5 illustrates receiving register 302 used in a first method in accordance with aspects of the present disclosure.

As shown in the figure, receiving register 302 includes sorted input array 502 from which unique elements must be extracted. Sorted input array 502 is originally stored in input array register 102 from FIG. 1, and is then provided to receiving register 302. Sorted input array 502 may be any array of m×n elements, however it shown in FIG. 5 as a 1×8 array with specific numerical values for the purposes of explanation and brevity. One of ordinary skill in the art will appreciate that the array operations described with respect to sorted input array 502 may be applied to any array of m×n elements.

To determine the unique elements within sorted input array 502, a masking array is created. In some example embodiments, this is performed by way of a series of masking arrays, the first of which is a transition mask array. This will be described in greater detail with reference to FIG. 6.

Figure 6:
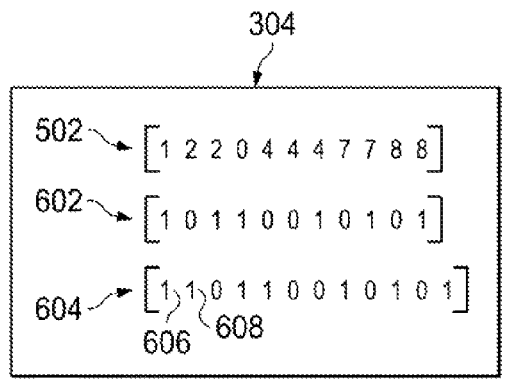
FIG. 6 illustrates an example comparing register used in a first method in accordance with aspects of the present disclosure.

FIG. 6 illustrates comparing register 304 used in a first method in accordance with aspects of the present disclosure.

As shown in the figure, comparing register 304 includes sorted input array 502, transition mask array 602, and modified transition mask array 604. Modified transition mask array 604 includes a plurality of binary valued elements, including an element 608 having binary value "1" and an element 606 having a binary value "1."

In operation, comparing register 304 receives sorted input array 502 from receiving register 302 via pathway 308 and creates transition mask array 602. To create transition mask array 602, comparing register 304 compares each element of sorted input array 502 to the subsequent element, and then assigns a 0 if the elements are equal and a 1 if the elements are not equal.

For example, the first element of sorted input array 502 has a value "1," whereas the second element of sorted input array 502 has a value "2". Comparing the first element of sorted input array 502 with the second element of sorted input array 502 shows that the values are not equal (1≠2), so comparing register 304 assigns a value of "1" to the first element of transition mask array 602.

Further, the third element of sorted input array 502 has a value "2". Comparing the second element of sorted input array 502 with the third element of sorted input array 502 shows that the values are equal (2=2), so comparing register 304 assigns a value of "0" to the second element of transition mask array 602.

The process continues until reaching the last element in sorted input array 502. The last element is treated as though there were a subsequent element in the array that is not equal to the last element. Following the same process described above, because the last element in input array 502 is treated as though there is a non-equal element that follows, comparing register 304 assigns a value of "1" to the last element in transition mask array 602. In this embodiment, transition mask array 602 has the same number of elements as sorted input array 502 of FIG. 5.

After transition mask array 602 is created, comparing register 304 then creates modified transition mask array 604. To create modified transition mask array 604, comparing register 304 adds element 606, which will has a binary value "1", to the first position of transition mask array 602, moving each element of transition mask array 602 one position to the right. Thus, modified transition mask 604 has one more element than transition mask array 602, and that element is a binary value "1" inserted in the first position of modified transition mask array 604.

Figure 7:
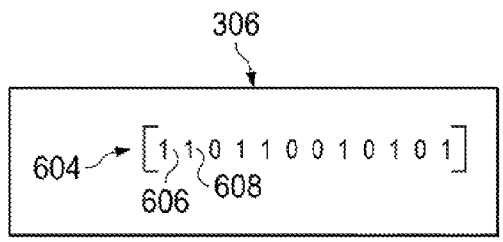
FIG. 7 illustrates an example output register used in a first method in accordance with aspects of the present disclosure.

FIG. 7 illustrates output register 306 used in a first method in accordance with aspects of the present disclosure.

As shown in the figure, output register 306 includes modified transition mask array 604.

In operation, output register 306 is configured to receive modified transition mask array 604 from comparing register 304 via pathway 310. Output register 306 then provides modified transition mask array 604 to receiving register 402 for further operations to determine the final mask. Methods to determine the final mask will be further described with reference to FIGS. 8-9.

Figure 8:
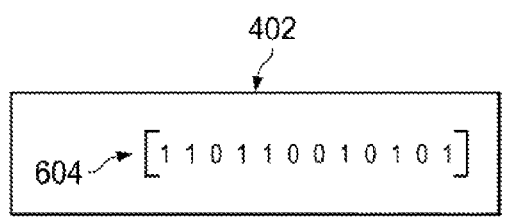
FIG. 8 illustrates an example receiving register of a final mask component in accordance with aspects of the present disclosure.

FIG. 8 illustrates receiving register 402 of final mask component 204 in accordance with aspects of the present disclosure.

As shown in the figure, receiving register 402 includes modified transition mask array 604.

In operation, receiving register 402 receives modified transition mask array 604 from output register 306. Receiving register 402 then provides modified transition mask array 604 to comparing register 404 via pathway 408.

Figure 9:
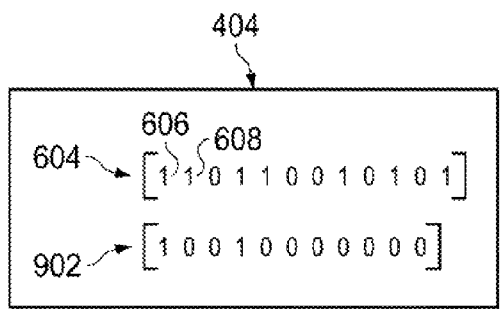
FIG. 9 illustrates an example comparing register of a final mask component in accordance with aspects of the present disclosure.

FIG. 9 illustrates comparing register 404 of final mask component 204 in accordance with aspects of the present disclosure.

As shown in the figure, comparing register 404 includes modified transition mask array 604 and final mask array 902.

In operation, comparing register 404 receives modified transition mask array 604 from output register 306 and creates final mask array 902. To create final mask array 902, comparing register 404 multiplies each element in modified transition mask array 604 to the subsequent element, and enters the resultant value in final mask array 902. For example, the first element of final mask array 902 is determined by multiplying element 606 with element 608. Since element 606 and element 608 both have binary value "1", the first element of final mask array 902 obtains a binary value "1." The second element of final mask array 902 is found by comparing element 608 with the third element of modified transition mask array 604. Because the result of the multiplication of those elements is "0", the second element of final mask array 902 is binary value "0". After continuing the multiplication operations with each element in modified transition mask array 604, final mask array 902 is complete.

Final mask array 902 is then provided to output register 406 (not shown) via pathway 410 (not shown). Output register then provides final mask array 902 to computing component 106.

Returning to FIG. 1, the final mask and the sorted input array are then provided to computing component 106 to determine the unique elements of the sorted input array. This will be described in greater detail with reference to FIG. 10.

Figure 10:
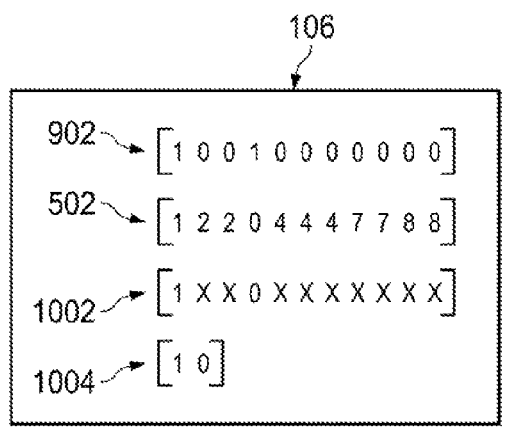
FIG. 10 illustrates an example computing component for determining unique elements from the sorted array of FIG. 5.

FIG. 10 illustrates an example computing component for determining unique elements from the sorted array of FIG. 5.

As shown in the figure, computing component 106 includes final mask array 902, sorted input array 502, output array 1002, and condensed output array 1004.

In operation, computing component 106 receives final mask array 902 and sorted input array 502 from determining component 104. In an alternative embodiment, computing component 106 may receive input array 502 directly from input array register 102. To create output array 1002, computing component 106 compares corresponding elements of final mask array 902 and sorted input array 502.

If the element of final mask array 902 has a binary value "1," the value of the corresponding element of sorted input array 502 is entered into output array 1002. If the element of final mask array 902 has a binary value "0," a value of "X" is entered in to output array 1002, where X is a marker value guaranteed to never appear in the input array 502.

For example, the first element of final mask array 902 has a binary value "1," and the corresponding first element of sorted input array 502 has a value "1", so a value of "1" is entered in to the first element of output array 1002. On the other hand, the second element of final mask array 902 has a binary value "0," and the corresponding second element of sorted input array 502 has a value "2," so a value "X" is entered as the second element of output array 1002. This process continues until output array 1002 contains a plurality of "X"s and the elements from sorted input array 502 that are unique.

Output array 1002 contains a list of p elements, where p is an integer greater than or equal to 0. The p elements of output array 1002 identify the elements from sorted input array 502 that are unique. In this example, p is equal to n, the number of elements in sorted input array 502. However, in some embodiments, p may be less than n.

In some applications, it may be desirable to remove the "X" elements from output array 1002 and thus be left with a condensed output array 1004 that contains only the unique elements found in sorted input array 502. Such a "X" removal process may be performed by any known method. Here, condensed output array 1004 contains a list of q elements, wherein q is an integer less than or equal top.

The example system and method discussed above with reference to FIGS. 1-10 may be further illustrated with MATLAB code.

First, a transition between sequences of equal value elements is detected by comparing each element in the input array with the subsequent element in the input array. The comparison resulting in equality provides a '0', otherwise a '1' is provided. To handle the last element, the input array is expanded by one element at the end. The value of the additional element is set a value different than the last element of the input array. This action takes advantage of SIMD vector operations, such as a vector compare. An N-way SIMD processor would see N times performance gain compared to a scalar processor.

Example MATLAB code to provide the above discussed function includes:

```
% Definition of input array
input=[1 2 2 3 4 4 4 7 7 8 8];
% Expand input by one element equal to the last element's value
subtracted by one. Here this new input array is named input2
input2= zeros(1,length(input)+1);
input2(1:end-1)=input; % copy input to input2
input2(end)= input(end)-1; % set last element to last element of input
minus 1
% Calculate transition array
t1= ((input2(1:1:end-1) ~= input2(2:1:end)));
%expected results for t1 is: t1= [1 0 1 1 0 0 1 0 1 0 1]
```

Next, all values that are present more than once are masked out by multiplying each element of the transition array with its predecessor. To handle the first element, the transition array is expanded by one element at the beginning, wherein the added element has a value of "1." This action takes advantage of the SIMD vector multiply operation.

Example MATLAB code to provide the above discussed function includes:

```
% Expand transition array by one element at the beginning, element is
equal to '1'. The new transition array is named t2.
t2= zeros(1,length(t1)+1);
t2(1)= 1;
t2(2:end)=t1(1:end);
% Mask is generated by multiplying each element by its predecessor.
mask= t2(2:end).*t2(1:length(t1));
%expected results for mask is: mask= [1 0 0 1 0 0 0 0 0 0 0]
```

Finally, the mask is used to select the unique element from the input array. An element whose associated mask value is "1" is unique and is added to the output array. Note that unique elements in the input array will be irregularly spaced. Therefore, they may not be efficiently processed by a conventional SIMD vector processor. This last action may include the implementation of hardware circuitry to perform a collate store. The process of collate store is where several points of interest are taken. These points of interest may not necessarily be contiguous in memory. The data is contiguously gathered into, to sustain efficient vector processing. Here the way the points of interest are chosen conditioned upon the values of the mask. In other words, with a conventional SIMD vector processor, the output generated would be: [1 0 0 3 0 0 0 0 0 0 0]. With a collate store, the output becomes: [1 3].

Example MATLAB code to provide the above discussed function includes:

```
output=input(mask==1);
%expected results for output is: output=[1 3]
```

Example of complete MATLAB code includes:

```
input=[1 2 2 3 4 4 4 7 7 8 8];
input2= zeros(1,length(input)+1);
input2(1:end-1)=input;
input2(end)= input(end)-1;
t1= ((input2(1:1:end-1) ~= input2(2:1:end)));
t2= zeros(1,length(t1)+1);
```

```
t2(1)= 1;
t2(2:end)=t1(1:end);
mask= t2(2:end).*t2(1:length(t1));
output= input(mask==1)
```

Described above, the first method to extract unique elements from a sorted array includes receiving a sorted array, creating a transition mask from the sorted array based on the elements in the sorted array, creating a modified transition mask based on the transition mask, and creating a final mask based on the modified transition mask. The final mask is then compared to the sorted array, and the results of the comparison are used to determine which values are unique within the sorted array.

Figure 11:
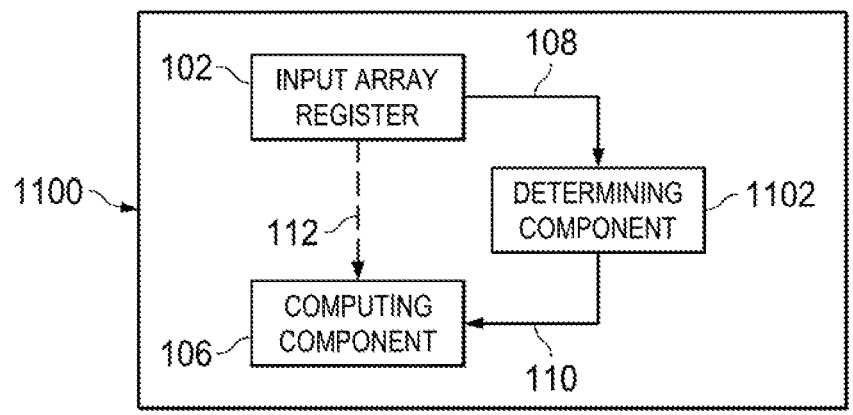
FIG. 11 illustrates an alternate embodiment of the device of FIG. 1.

FIG. 11 illustrates an alternate embodiment of the device of FIG. 1.

As shown in the figure, device 1100 includes input array register 102, a determining component 1102, computing component 106, and pathways 108, 110, and 112. In this embodiment, input array register 102, determining component 1102 and computing component 106 are implemented as distinct elements. However, in some embodiments, at least two of input array register 102, determining component 1102 and computing component 106 may be implemented as a unitary element, wherein at least one of pathways 108, 110, and 112 will not be used. Further, in some embodiments, at least one of input array register 102, determining component 1102 and computing component 106 may be implemented as non-transient, tangible computer-readable media for carrying or having computer-executable instructions or data structures stored thereon. In an example embodiment, at least one of determining component 1102 and computing component 106 has a vector SIMD architecture.

Input array register 102, computing component 106, and pathways 108, 110, and 112 were previously described with reference to FIG. 1. Determining component 1102 will be further described with reference to FIGS. 12-19.

Figure 12:
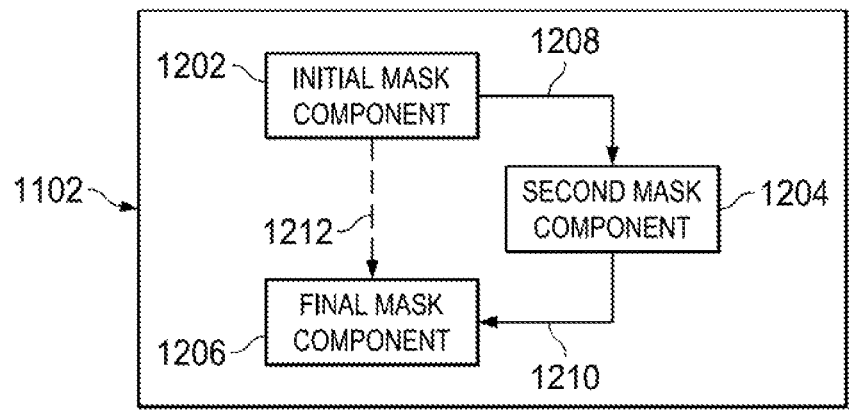
FIG. 12 illustrate an example determining component of the alternative embodiment of the device in accordance with aspects of the present disclosure.

FIG. 12 illustrates determining component 1102 of the alternative embodiment of the device in accordance with aspects of the present disclosure.

As shown in the figure, determining component 1102 includes an initial mask component 1202, a second mask component 1204, a final mask component 1206, and pathways 1208, 1210, and 1212. In this embodiment, initial mask component 1202, second mask component 1204 and final mask component 1206 are implemented as distinct elements. However, in some embodiments, at least two of initial mask component 1202, second mask component 1204 and final mask component 1206 may be implemented as a unitary element, wherein at least one of pathways 1208, 1210, and 1212 will not be used. Further, in some embodiments, at least one of input initial mask component 1202, second mask component 1204 and final mask component 1206 may be implemented as non-transient, tangible computer-readable media for carrying or having computer-executable instructions or data structures stored thereon.

Initial mask component 1202 is operable to receive a sorted input array of n elements from input array register 102 and create an initial mask array of n elements based on the input array of n elements. The elements in the initial mask array will have a binary value of "0" or "1," based on the elements in the input array. The process by which a "0" or "1" is assigned to different positions within the mask array will be further described with reference to FIGS. 13-15.

Figure 13:
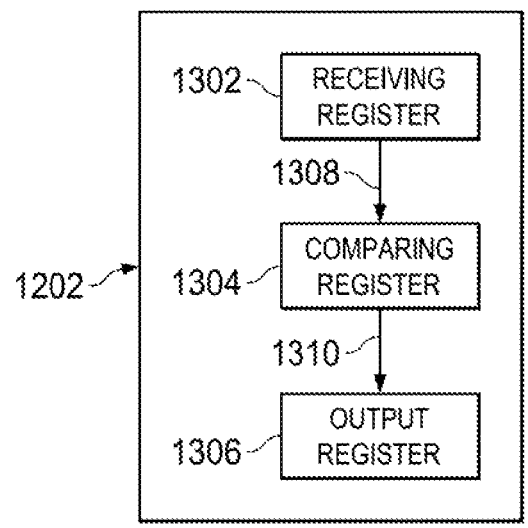
FIG. 13 illustrates an example initial mask component of the determining component of FIG. 12 in accordance with aspects of the present disclosure.

FIG. 13 illustrates initial mask component 1202 in accordance with aspects of the present disclosure.

As shown in the figure, initial mask component 1202 includes a receiving register 1302, a comparing register 1304, an output register 1306, and pathways 1308 and 1310.

In this embodiment, receiving register 1302, comparing register 1304 and output register 1306 are implemented as distinct elements. However, in some embodiments, at least two of receiving register 1302, comparing register 1304 and output register 1306 may be implemented as a unitary element. Further, in some embodiments, at least one of receiving register 1302, comparing register 1304 and output register 1306 may be implemented as non-transient, tangible computer-readable media for carrying or having computer-executable instructions or data structures stored thereon. In an example embodiment, comparing register 1304 has a vector SIMD architecture.

In operation, receiving register 1302 is configured to receive an input array from input array register 102 via pathway 108. Receiving register 1302 then provides the input array to comparing register 1304 via pathway 1308. Comparing register 1304 proceeds to compare elements of the input array to each other and create an initial mask array based on the outcome of the comparison. The process of comparing elements and creating an initial mask array will be further described with reference to FIGS. 14-15. Comparing register 1304 then provides the initial mask array to output register 1306 via pathway 1310.

Figure 14:
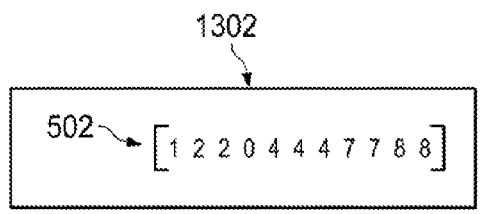
FIG. 14 illustrates a receiving register of an initial mask component used in a second method in accordance with aspects of the present disclosure.

FIG. 14 illustrates receiving register 1302 of initial mask component 1202 used in a second method in accordance with aspects of the present disclosure.

As shown in the figure, receiving register 1302 includes sorted input array 502 from which unique elements must be extracted. Sorted input array 502 is originally stored in input array register 102 from FIG. 1, and is then provided to receiving register 1302. Sorted input array 502 may be any array of m×n elements, however it shown in FIG. 14 as a 1×8 array with specific numerical values for the purposes of explanation and brevity. One of ordinary skill in the art will appreciate that the array operations described with respect to sorted input array 502 may be applied to any array of m×n elements.

Figure 15:
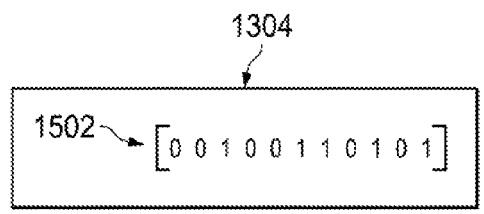
FIG. 15 illustrates a comparing register of an initial mask component used in a second method in accordance with aspects of the present disclosure.

FIG. 15 illustrates comparing register 1304 of initial mask component 1202 used in a second method in accordance with aspects of the present disclosure.

As shown in the figure, comparing register 1304 includes initial mask array 1502.

In operation, comparing register 1304 receives sorted input array 502 from receiving register 1302 via pathway 1308. To create initial mask array 1502, each element in sorted input array 502 is compared to the previous element in the array. A binary value of "1" is assigned when the comparison finds the two elements equal, and a binary value of "0" is assigned when the comparison finds the two elements not equal.

To begin the process with the first element, a virtual element may be created that is placed in front of the first element and is not equal in value to the first element. For example, comparing the first element of sorted input array 502 to the virtual element would result in a binary value of "0" because the two elements are not equal. The binary "0" value would be entered as the first element of initial mask array 1502.

In this example, the first element in sorted input array 502 is "1" and the second element in sorted input array 502 is "2". Comparing the second element of sorted input array 502 to the first to the first element of sorted input array 502 would result in a binary value of "0" because the two elements are not equal (1≠2), so the second element of initial mask array 1502 would also have a binary value of "0".

In this example, the third element in sorted input array 502 is "2". Comparing the third element of sorted input array 502 to the second element of sorted input array 502 results in a binary value of "1" because the two elements are equal (2=2), and the third element of initial mask array 1502 would have a binary value of "1." This comparison process will continue until all values in sorted input array 502 are compared with previous values, and the results are entered into initial mask array 1502.

Initial mask array 1502 is then provided to output register 1306 (not shown) via pathway 1310 (not shown). Output register 1306 then provides initial mask array 1502 to either second mask component 1204 via pathway 1208 or to final mask component 1206 via pathway 1212. Output register 1306 may also provide sorted input array 502 to second mask component 1204 via pathway 1208.

Returning to FIG. 12, second mask component 1204 communicates with initial mask component 1202 via pathway 1208. Second mask component 1204 is operable to receive the initial mask array of n elements from initial mask component 1202 via pathway 1208. Second mask component 1204 is also operable to receive sorted input array 502 from initial mask component 1202 and create a second mask array based on sorted input array 502. The elements in the second mask array will be either "0" or "1," based on the elements in sorted input array 502. The process by which a "0" or "1" is assigned to different positions within the second mask array will be further described with reference to FIGS. 16-18.

Figure 16:
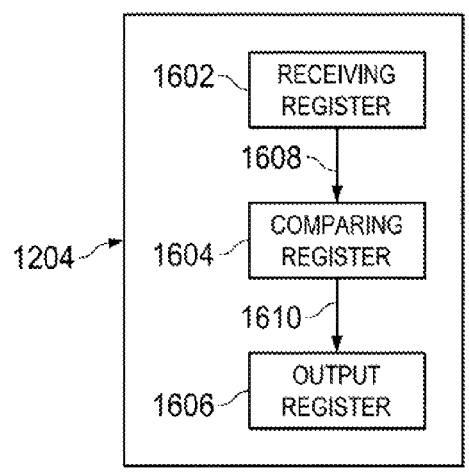
FIG. 16 illustrates an example second mask component of the determining component of FIG. 12 in accordance with aspects of the present disclosure.

FIG. 16 illustrates second mask component 1204 in accordance with aspects of the present disclosure.

As shown in the figure, second mask component 1204 includes a receiving register 1602, a comparing register 1604, an output register 1606, and pathways 1608 and 1610.

In this embodiment, receiving register 1602, comparing register 1604 and output register 1606 are implemented as distinct elements. However, in some embodiments, at least two of receiving register 1602, comparing register 1604 and output register 1606 may be implemented as a unitary element. Further, in some embodiments, at least one of receiving register 1602, comparing register 1604 and output register 1606 may be implemented as non-transient, tangible computer-readable media for carrying or having computer-executable instructions or data structures stored thereon. In an example embodiment, comparing register 1604 has a vector SIMD architecture.

In operation, receiving register 1602 is configured to receive an input array from initial mask component 1202 via pathway 1208. In an alternate embodiment, receiving register 1602 may be configured to receive an input array directly from input array register 102 via a different pathway. Receiving register 1602 then provides the input array to comparing register 1604 via pathway 1608. Comparing register 1604 proceeds to compare elements of the input array to each other and create a second mask array based on the outcome of the comparison. The process of comparing elements and creating a second mask array will be further described with reference to FIGS. 17-18. Comparing register 1604 then provides the second mask array to output register 1606 via pathway 1610.

Figure 17:
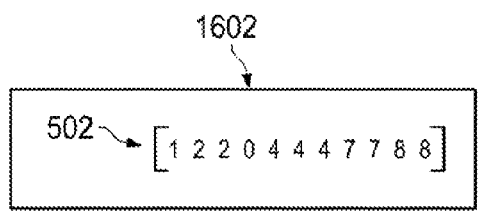
FIG. 17 illustrates an example receiving register of a second mask component used in a second method in accordance with aspects of the present disclosure.

FIG. 17 illustrates receiving register 1602 of second mask component 1204 used in a second method in accordance with aspects of the present disclosure.

As shown in the figure, receiving register 1602 includes sorted input array 502 from which unique elements must be extracted. Sorted input array 502 is originally stored in input array register 102 from FIG. 1, and is then provided to receiving register 1302. Output register 1306 may provide sorted input array 502 to receiving register 1602. In continuing with the example shown in FIG. 14, sorted input array 502 is a 1×8 array with specific numerical values for the purposes of explanation and brevity. One of ordinary skill in the art will appreciate that the array operations described with respect to sorted input array 502 may be applied to any array of m×n elements.

Figure 18:
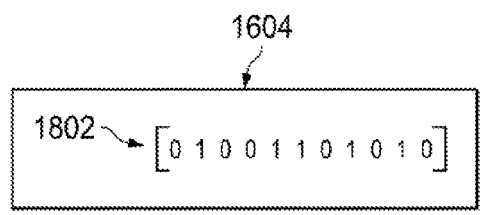
FIG. 18 illustrates an example comparing register of a second mask component used in a second method in accordance with aspects of the present disclosure.

FIG. 18 illustrates comparing register 1604 of second mask component 1204 used in a second method in accordance with aspects of the present disclosure.

As shown in the figure, comparing register 1604 includes second mask array 1802.

In operation, comparing register 1604 receives sorted input array 502 from receiving register 1602. To create second mask array 1802, each element in sorted input array 502 is compared to the subsequent element in the array. A binary value of "1" is assigned when the comparison finds the two elements equal, and a binary value of "0" is assigned when the comparison finds the two elements not equal. To end the process with the last element, a virtual element may be created that is placed behind the last element and is not equal in value to the last element. For example, comparing the last element of sorted input array 502 to the virtual element would result in a binary value of "0" because the two elements are not equal. The binary value "0" would be entered as the last element of second mask array 1802.

In this example, the first element in sorted input array 502 is "1" and the second element in sorted input array 502 is "2." Comparing the first element of sorted input array 502 to the second element of sorted input array 502 would result in a binary value of "0" because the two elements are not equal (1≠2), so the first element of second mask array 1802 would have a binary value "0."

In this example, the third element of sorted input array 502 is "2." Comparing the second element of sorted input array 502 to the third element of sorted input array 502 results in a binary value of "1" because the two elements are equal (2=2), and the second element of second mask array 1802 would have a binary value "1". This comparison process will continue until all values in sorted input array 502 are compared with subsequent values, and the results are entered into second mask array 1802.

Second mask array 1802 is then provided to output register 1606 (not shown) via pathway 1610 (not shown). Output register 1606 then provides second mask array 1802 to final mask component 1206 via pathway 1210. Output register 1606 may also provide initial mask array 1502 to final mask component 1206 via pathway 1210.

Returning to FIG. 12, final mask component 1206 communicates with second mask component 1306 via pathway 1210. Final mask component 1206 is operable to receive the second mask array of n elements from second mask component 1204 via pathway 1308. Final mask component 1206 is also operable to receive the initial mask array of n elements from either pathway 1210 or pathway 1212. Final mask component 1206 creates a final mask array of n elements based on the comparison of the initial mask array and the second mask array. The elements in the final mask array will be either "0" or "1," based on the results of the comparison. The process by which a "0" or "1" is assigned to different positions within the final mask array will be further described with reference to FIGS. 19-21.

Figure 19:
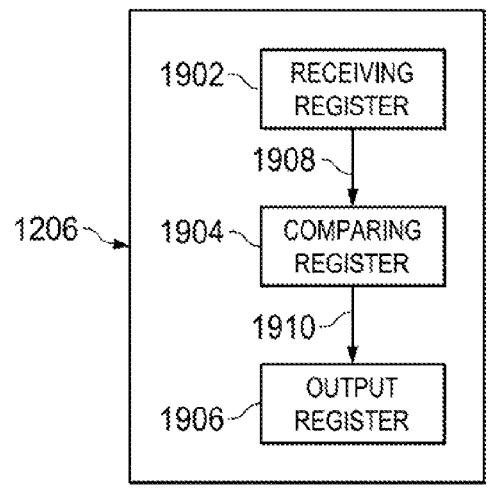
FIG. 19 illustrates an example final mask component of the determining component of FIG. 12 in accordance with aspects of the present disclosure.

FIG. 19 illustrates final mask component 1206 in accordance with aspects of the present disclosure.

As shown in the figure, final mask component 1206 includes a receiving register 1902, a comparing register 1904, an output register 1906, and pathways 1908 and 1910.

In this embodiment, receiving register 1902, comparing register 1904 and output register 1906 are implemented as distinct elements. However, in some embodiments, at least two of receiving register 1902, comparing register 1904 and output register 1906 may be implemented as a unitary element. Further, in some embodiments, at least one of receiving register 1902, comparing register 1904 and output register 1906 may be implemented as non-transient, tangible computer-readable media for carrying or having computer-executable instructions or data structures stored thereon. In an example embodiment, comparing register 1904 has a vector SIMD architecture.

In operation, receiving register 1902 is configured to receive an initial mask array and a second mask array from output register 1606 of transition mask component 1204. In an alternate embodiment, receiving register 1902 may receive the initial mask array from output register 1204 of initial mask component 1202 via pathway 1212, and the second mask array from output register 1606 of transition mask component 1204 via pathway 1210. Receiving register 1902 then provides the initial mask array and second mask array to comparing register 1904 via pathway 1908. Comparing register 1904 proceeds to compare elements of the initial mask array and second mask array to each other and create a final mask array based on the outcome of the comparison. The process of comparing elements and creating a final mask array will be further described with reference to FIGS. 20-21. Comparing register 1904 then provides the final mask array to output register 1906.

Figure 20:
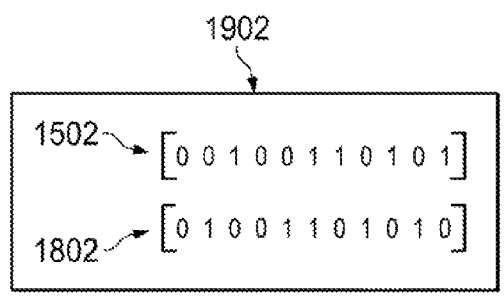
FIG. 20 illustrates an example receiving register of an example final mask component used in a second method in accordance with aspects of the present disclosure.

FIG. 20 illustrates receiving register 1902 of final mask component 1206 used in a second method in accordance with aspects of the present disclosure.

As shown in the figure, receiving register 1902 includes initial mask array 1502 and second mask array 1802.

In operation, receiving register 1902 receives initial mask array 1502 from output register 1204 via pathways 1208 and 1210, or in an alternative embodiment, via pathway 1212. Receiving register 1902 also receives second mask array 1802 from output register 1606 via pathway 1210. Receiving register 1902 then provides initial mask array 1502 and second mask array 1802 to comparing register 1904 via pathway 1908.

Figure 21:
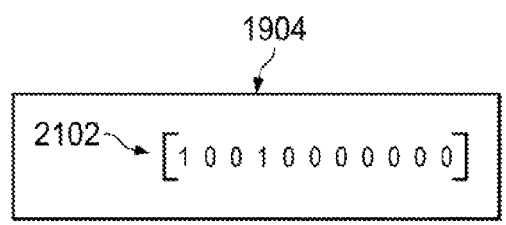
FIG. 21 illustrates an example comparing register of an example final mask component used in a second method in accordance with aspects of the present disclosure.

FIG. 21 illustrates comparing register 1904 of final mask component 1206 used in a second method in accordance with aspects of the present disclosure. As shown in the figure, comparing register 1904 includes final mask array 2102.

In operation, comparing register 1904 receives initial mask array 1502 and second mask array 1802 as described above with reference to FIG. 20. To create final mask array 2102, elements of initial mask array 1502 and second mask array 1802 are compared to each other, and values are assigned to final mask 2102 based on the comparison. The comparison is made with a binary logical OR operation, where two values are compared to each other, followed by a bit inversion. In a binary logical OR operation, if both binary values are "0." the output is a binary value "0." If any of the binary values are "1", then the binary output is "1." In the current method, after the values are generated from the binary logical OR operation, they are then bit inverted to arrive at the final value. Therefore, any pair of values that have at least one binary value "1" component will return a binary value "0." and any pair of values that are both binary "0" will return a binary value of "1."

For example, the first element of initial mask array 1502 has a binary value "0" and the first element of second mask array 1802 has a binary value "0." Comparing the first elements of initial mask array 1502 and second mask array 1802 reveals that both binary values are "0," so the output of the bit inverted OR analysis will result in a binary value of "1," which is assigned to the first element of final mask 2102.

Further, the second element of initial mask array 1502 has a binary value "0" and the second element of second mask array 1802 has a binary value "1." The output of the bit inverted OR analysis of these elements results in a binary value of "0", which is assigned to the second element of final mask 2102. The analysis will continue until all elements of initial mask array 1502 and second mask array 1802 have been compared and final mask 2102 is complete.

Figure 22:
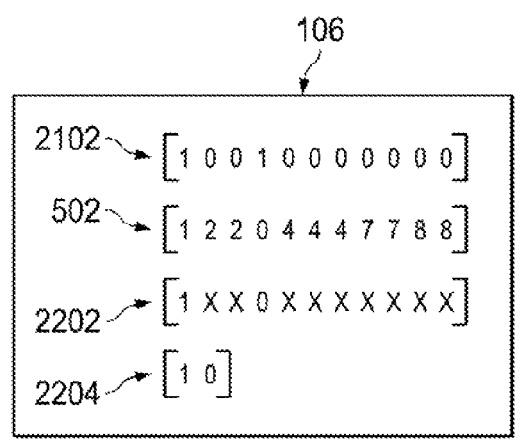
FIG. 22 illustrates the second method of determining unique elements from the sorted array of FIG. 5.

FIG. 22 illustrates the second method of determining unique elements from the sorted array of FIG. 5.

As shown in the figure, computing component 106 includes final mask array 2102, sorted input array 502, an output array 2202, and a condensed output array 2204.

In operation, computing component 106 receives final mask array 2102 and sorted input array 502 from output register 1906 via pathway 110. In an alternative embodiment, input array register 102 may provide sorted input array 502 to computing component 106 directly via pathway 112. To create output array 2202, computing component 106 compares corresponding elements of final mask array 2102 and sorted input array 502. If the binary value of an element of final mask array 2102 is "1," the corresponding element of sorted input array 502 is entered into output array 2202. If the binary value of an element of final mask array 2102 is a "0." a "X" is entered into output array 2202, where X is a marker value guaranteed to never appear in the input array 502.

For example, the binary value of the first element of final mask array 2102 is "1," and the corresponding first element of sorted input array 502 is "1," so a "1" is entered in to the first element of output array 2202. The binary value of the second element of final mask array 2102 is a "0," and the corresponding second element of sorted input array 502 is "2," so a "X" is entered as the second element of output array 2202. This process continues until output array 2202 contains only "X" values and the elements from sorted input array 502 that are unique.

Output array 2202 contains a list of p elements, where p is an integer greater than or equal to 0. The p elements of output array 2202 identify the elements from sorted input array 502 that are unique. In this example, p is equal to n, the number of elements in sorted input array 502. However, in some embodiments, p may be less than n.

In some instances, it may be desirable to remove the "X" elements and be left with condensed output array 2204 that contains only the unique elements found in sorted input array 502. Any known method for removing the "X" elements may be used to perform this feature. Here, condensed output array 2204 contains a list of q elements, wherein q is an integer less than or equal top.

The example system and method discussed above with reference to FIGS. 11-22 may be further illustrated with MATLAB code.

First, an initial mask is created by comparing each element in the input array with the previous element in the input array. The comparison resulting in equality provides a '0', otherwise a '1' is provided. To handle the first element for which the previous element does not exist, a virtual 'previous element' is created and is assigned a value different than the first element. This action takes advantage of a SIMD vector operation such as vector compare. An N-way SIMD processor would see N times performance gain compared to a scalar processor.

Example Matlab code to provide the above discussed function includes:

```
% Definition of input array
input = [1 2 2 3 4 4 4 7 7 8 0];
% array input2 is created to hold the previous element of each element in
input.
input2 = zeros(1,length(input));
% input2(1) is a virtual previous element of input(1) and is set to a value
different than first element;
input2(1) = input(1)−1;
% The remaining element in input2 are just the elements of input.
input2(2:end) = input(1:end−1);
% Compute mask #1
mask1 = (input == input2);
```

Next, a second mask is created by comparing each element in the input array with the subsequent element in the input array. The comparison resulting in equality provides a '0', otherwise a '1' provided. To handle the last element for which the next element does not exist, a virtual 'next element' is created and is assigned a value different than the last element. This action takes advantage of a SIMD vector operation such as vector compare. A N-way SIMD processor would see N times performance gain compared to a scalar processor.

Example Matlab code to provide the above discussed function includes:

```
% array input3 is created to hold the next element of each element in
input.
input3 = zeros(1,length(input));
% input3(end) is a virtual next element of input(end) and is set to a value
different than last element
input3(end) = input(end)−1;
% The remaining element in input3 are just the elements of input.
input3(1:end−1) = input(2:end);
% Compute mask #2
mask2 = (input == input3);
```

Then, the initial mask and the second mask are ORed, and the result is bit-inverted to produce the final mask.

Example Matlab code to provide the above discussed function includes:

mask=~(mask1|mask2):

Finally, the final mask is used to select the unique element from the input array. An element whose associated mask value is 1 is unique and is added to the output array. Note that unique elements in the input array will be irregularly spaced. Therefore, they may not be efficiently processed by a conventional SIMD vector processor. This last action may include the implementation of hardware circuitry to perform a collate store. The process of collate store is where several points of interest are taken. These points of interest may not necessarily be contiguous in memory. The data is contiguously gathered into, to sustain efficient vector processing. Here the way the points of interest are chosen conditioned upon the values of the mask. In other words, with a conventional SIMD vector processor, the output generated would be: [1 0 0 3 0 0 0 0 0 0 0]. With a collate store, the output becomes: [1 3].

Example MATLAB code to provide the above discussed function includes:

```
output=input(mask==1);
%expected results for output is: output=[1 3]
```

Example of complete MATLAB code includes:

```
% Definition of input array
input = [1 2 2 3 4 4 4 7 7 8 0];
% array input2 is created to hold the previous element of each element in
input.
input2 = zeros(1,length(input));
% input2(1) is a virtual previous element of input(1) and is set to a value
different than first element
input2(1) = input(1)−1;
% The remaining element in input2 are just the elements of input.
input2(2:end) = input(1:end−1);
% Compute mask #1
mask1 = (input == input2);
% array input3 is created to hold the next element of each element in
input.
input3 = zeros(1,length(input));
% input3(end) is a virtual next element of input(end) and is set to a value
different than last element
input3(end) = input(end)−1;
% The remaining element in input3 are just the elements of input.
input3(1:end−1) = input(2:end);
% Compute mask #2
mask2 = (input == input3);
mask = ~(mask1|mask2);
output= input(mask==1)
```

Described above, the second method to extract unique elements from a sorted array includes receiving a sorted array, creating an initial mask based on the elements in the sorted array, creating a second mask based on the elements in the sorted array, and creating a final mask based on a comparison between the initial mask and the second mask. The final mask is then compared to the sorted array, and the results of the comparison are used to determine which values are unique within the sorted array.

The methods to extract unique elements from a sorted array of elements were shown above for a 1×8 array. In practice, arrays analyzed using these methods may be much larger, m×n arrays. Using a traditional scalar processor with the methods described herein would require the processor to apply comparison and multiplication operations to each of the elements in the m×n array in series. However, in accordance with aspects of the present disclosure, a vector SIMD architecture is used to apply comparison and multiplication operations to multiple elements simultaneously. As such, the present disclosure provides for analysis of multiple elements of the m×n array at the same time, thus greatly reducing processing time and increasing processing efficiency.

The foregoing description of various preferred embodiments have been presented for purposes of illustration and description. It is not intended to be exhaustive or to limit the disclosure to the precise forms disclosed, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto.

What is claimed as new and desired to be protected by Letters Patent of the United States is:

1. A device comprising:
    an input array register operable to store a sorted list of n elements as an input array having size n, n being an integer greater than or equal to two;
    a determining component connected to the input array register, the determining component operable to create a list of in elements as a mask array having a size in, in being an integer greater than or equal to one, one of the in elements being based on two adjacent elements of the n elements of the input array; and
    a computing component connected to one of the input array register and the determining component, the computing component operable to perform a mathematical operation between the input array and the mask array to generate a list of p elements as an output array having a size p, p being an integer greater than or equal to 0, the p elements identifying unique elements within the n elements.

2. The device of claim 1, in which the determining component includes a transition mask component operable to create a transition list of n elements as a transition array having size n, each element within the transition list of n elements being based on a corresponding element within the sorted list of n elements and a subsequent element within the sorted list of n elements.

3. The device of claim 2, in which the transition mask component is operable to generate a value of 1 when the corresponding element within the sorted list of n elements has a different value from the subsequent element within the sorted list of n elements and is operable to generate a value of 0 when the corresponding element within the sorted list of n elements has the same value as the value the subsequent element within the sorted list of n elements.

4. The device of claim 2, in which the determining component further includes a final mask component connected to the transition mask component, the final mask component being operable to create a final list of n elements as the mask array having size n, each element within the final list of n elements being based on a corresponding element within the transition list of n elements and a predecessor element within the transition list of n elements, and in which n is equal to in.

5. The device of claim 4, in which the final mask component is operable to add an element of value of 1 to the transition list of n elements, is operable to generate a value of 1 when the corresponding element within the transition list of n elements and the added element of value 1 has the same value from the predecessor element within the transition list of n elements and the added element of value 1 and is operable to generate a value of 0 when the corresponding element within the transition list of n elements and the added element of value 1 has a different value as the predecessor element within the transition list of n elements and the added element of value 1.

6. The device of claim 4, in which the computing component is operable to multiply the input array and the mask array to generate the list of p elements as the output array, and in which p is equal to n.

7. The device of claim 1, in which the determining component includes an initial mask component operable to create an initial list of n elements as an initial mask array having size n, each element within the initial list of n elements being based on a corresponding element within the sorted list of n elements and a previous element within the sorted list of n elements.

8. The device of claim 7, in which the initial mask component is operable to generate a value of 1 when the corresponding element within the sorted list of n elements has the same value as the previous element within the sorted list of n elements and is operable to generate a value of 0 when the corresponding element within the sorted list of n elements has a different value as the value of the previous element within the sorted list of n elements.

9. The device of claim 7, in which the determining component additionally includes an second mask component operable to create a second list of n elements as a second mask array having size n, each element within the second list of n elements being based on a corresponding element within the sorted list of n elements and a subsequent element within the sorted list of n elements.

10. The device of claim 9, in which the second mask component is operable to generate a value of 1 when the corresponding element within the sorted list of n elements has the same value as the subsequent element within the sorted list of n elements and is operable to generate a value of 0 when the corresponding element within the sorted list of n elements has a different value as the value of the subsequent element within the sorted list of n elements.

11. The device of claim 9, in which the determining component additionally includes an final mask component connected to the second mask component, the final mask component being operable to create a final list of n elements as a final mask array having size n, each element within the final list of n elements being based on a corresponding element within the initial list of n elements and a corresponding element within the second list of n elements.

12. The device of claim 11, in which the final mask component is operable to generate a value of 1 when the corresponding element within the initial list of n elements has value of 0 and when the corresponding element within the second list of n elements has a value of 0 and is operable to generate a value of 0 when the corresponding element within the initial list of n elements has value of 1 or when the corresponding element within the second list of n elements has a value of 1.

13. The device of claim 11, in which the computing component operable to multiply the input array and the final mask array to generate the list of p elements as the output array, and in which p is equal to n.

14. The device of claim 1, in which the computing component is further operable to generate a list of q elements as the output array having a size q, q being an integer less than or equal to p, the q elements consisting of unique elements within the n elements.

15. A method comprising:
    storing, via an input array register, a sorted list of n elements as an input array having size n, n being an integer greater than or equal to two;
    creating, via a determining component, a list of in elements as a mask array having a size in, in being an integer greater than or equal to one, one of the in elements being based on two adjacent elements of the n elements of the input array; and
    performing, via a computing component, a mathematical operation between the input array and the mask array to generate a list of p elements as an output array having a size p, p being an integer greater than or equal to 0, the p elements identifying unique elements within the n elements.

16. The method of claim 15, in which the performing, via a computing component, a mathematical operation includes creating, via a transition mask component, a transition list of n elements as a transition array having size n, each element within the transition list of n elements being based on a corresponding element within the sorted list of n elements and a subsequent element within the sorted list of n elements.

17. The method of claim 16, in which the performing, via a computing component, a mathematical operation further includes creating, via a final mask component, a final list of n elements as the mask array having size n, each element within the final list of n elements being based on a corresponding element within the transition list of n elements and a predecessor element within the transition list of n elements, and in which n is equal to m.

18. The method of claim 17, in which the performing, via a computing component, a mathematical operation includes multiplying, via the computing component, the input array and the mask array to generate the list of p elements as the output array, and in which p is equal to n.

19. The method of claim 15, in which the performing, via a computing component, a mathematical operation includes creating, via an initial mask component, an initial list of n elements as an initial mask array having size n, each element within the initial list of n elements being based on a corresponding element within the sorted list of n elements and a previous element within the sorted list of n elements.

20. The method of claim 15, in which the performing, via a computing component, a mathematical operation includes generating, via the computing component, a list of q elements as the output array having a size q, q being an integer less than or equal to p, the q elements consisting of unique elements within the n elements.

* * * * *